(12) United States Patent
Kim et al.

(10) Patent No.: US 9,311,916 B2
(45) Date of Patent: Apr. 12, 2016

(54) APPARATUS AND METHOD FOR IMPROVING VOICE RECOGNITION

(71) Applicant: ELECTRONICS AND TELECOMMUNICATIONS RESEARCH INSTITUTE, Daejeon (KR)

(72) Inventors: Ju-Yeob Kim, Daejeon (KR); Bon-Tae Koo, Daejeon (KR); Tae-Joong Kim, Seongnam-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/667,675

(22) Filed: Mar. 24, 2015

(65) Prior Publication Data

US 2015/0279385 A1  Oct. 1, 2015

(30) Foreign Application Priority Data

Mar. 27, 2014  (KR) .................. 10-2014-0035720

(51) Int. Cl.
| | |
|---|---|
| *G10L 21/02* | (2013.01) |
| *G10L 15/18* | (2013.01) |
| *G10L 15/20* | (2006.01) |
| *G10L 15/02* | (2006.01) |
| *G10L 21/0208* | (2013.01) |
| *G10L 25/24* | (2013.01) |

(52) U.S. Cl.
CPC ................ *G10L 15/20* (2013.01); *G10L 15/02* (2013.01); *G10L 21/0208* (2013.01); *G10L 25/24* (2013.01)

(58) Field of Classification Search
CPC ...... G10L 15/02; G10L 15/20; G10L 21/0208; G10L 2025/935; G10L 25/24
USPC .................................................. 704/225, 205
See application file for complete search history.

(56) References Cited

U.S. PATENT DOCUMENTS

| | | | |
|---|---|---|---|
| 2010/0153104 A1 | 6/2010 | Yu et al. | |
| 2011/0077939 A1 | 3/2011 | Jung et al. | |
| 2013/0179158 A1* | 7/2013 | Nakamura | .............. G10L 21/00 704/205 |

FOREIGN PATENT DOCUMENTS

KR  10-2005-0063995 A  6/2005

OTHER PUBLICATIONS

Y. Ephraim et al., "Speech Enhancement Using a Minimum Mean-Square Error Log-Spectral Amplitude Estimator," IEEE Transactions on Acoustics, Speech, and Signal Processing, vol. ASSP-33, No. 2, Apr. 1985.

Dong Yu et al., "Robust Speech Recognition Using a Cepstral Minimum-Mean-Square-Error-Motivated Noise Suppressor," IEEE Transactions on Audio, Speech, and Language Processing, vol. 16, No. 5, Jul. 2008.

* cited by examiner

*Primary Examiner* — Charlotte M Baker
(74) *Attorney, Agent, or Firm* — Rabin & Berdo, P.C.

(57) ABSTRACT

An apparatus and method for improving voice recognition are disclosed herein. The apparatus includes a standard voice transmission unit, a Mel-frequency cepstrum coefficient (MFCC) generation unit, and an MFCC compensation unit. The standard voice transmission unit generates a standard voice. The MFCC generation unit generates voice feature data (MFCC) based on the utterance of the standard voice before voice recognition. The MFCC compensation unit stores a gain value generated based on the standard voice, and compensates for the distortion of the voice feature data based on the utterance of a user using the gain value during the voice recognition.

9 Claims, 7 Drawing Sheets

APPARATUS AND METHOD FOR IMPROVING VOICE RECOGNITION

CROSS-REFERENCE TO RELATED APPLICATION

This application claims the benefit of Korean Patent Application No. 10-2014-0035720, filed Mar. 27, 2014, which is hereby incorporated by reference herein in its entirety.

BACKGROUND

1. Technical Field

The present invention relates generally to an apparatus and method for improving voice recognition and, more particularly, to an apparatus and method that are capable of improving voice recognition rate in a voice recognition process.

2. Description of the Related Art

Voice recognition is problematic in that recognition rate is reduced by surrounding noise, other than voice. In general, a reduction in recognition rate in the word level of a voice recognizer may be viewed as resulting from the distortion of a voice signal attributable to surrounding noise. The reason why the distortion of the voice signal reduces voice recognition rate is that a resulting value that cannot be determined to be a specific state when compared with a leant acoustics database included in a voice recognizer is derived. This problem occurs in most voice recognizers that perform voice recognition based on a hidden Markov model (HMM) algorithm.

Voice recognizers based on an HMM algorithm extract data called a Mel-frequency cepstrum coefficient (MFCC) on a specific time unit basis. The MFCC extracted on a specific time unit basis is transferred to the decoder part of the voice recognizer, and voice recognition decoding is performed according to the process of an HMM algorithm based on actually learnt acoustics and language databases.

In this case, the voice recognition rate is reduced due to a problem that occurs when an MFCC value distorted due to surrounding noise is transferred to the decoder of the voice recognizer. The voice recognition rate may be improved by appropriately removing or compensating for a noise component.

In the past research, there was proposed a method of removing a noise signal from a voice signal in the time or frequency domain. Research into this method has been carried out regardless of the field of voice recognition.

However, this method is disadvantageous in that the distortion of voice different from the learnt database of a voice recognizer may be generated. In general, in this method, the signal to noise ratio (SNR) regarding noise and a voice signal is estimated and multiplied by a gain value in the frequency or time domain. If an erroneous SNR value is estimated, the recognition rate is reduced or a high noise removal effect may not be obtained. Furthermore, a problem arises in that computational complexity increases because the influence of noise must estimated with respect to each frequency value.

Figure 1:
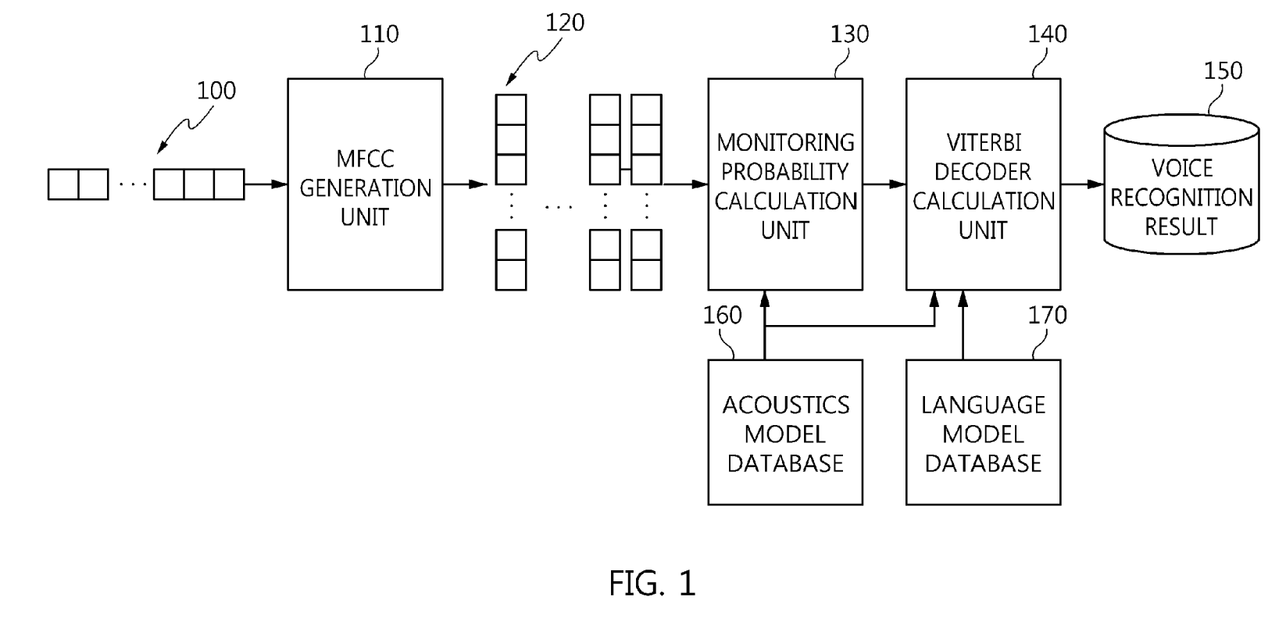
FIG. 1 is a diagram illustrating the process of a conventional HMM-based voice recognizer.

In the case of an HMM-based voice recognizer illustrated in FIG. 1, an MFCC generation unit 110 generates an MFCC 120 based on received voice data 100. A monitoring probability calculation unit 130 and a Viterbi decoder calculation unit 140 perform sequential calculation processes on the MFCC 120, thereby being able to obtain a voice recognition result 150. In this case, the monitoring probability calculation unit 130 and the Viterbi decoder calculation unit 140 must receive data from an acoustics model database 160 and a language model database 170, i.e., voice recognition learning data. In this case, the monitoring probability calculation unit 130 and the Viterbi decoder calculation unit 140 may be viewed as corresponding to the decoder of the voice recognizer.

Figure 2:
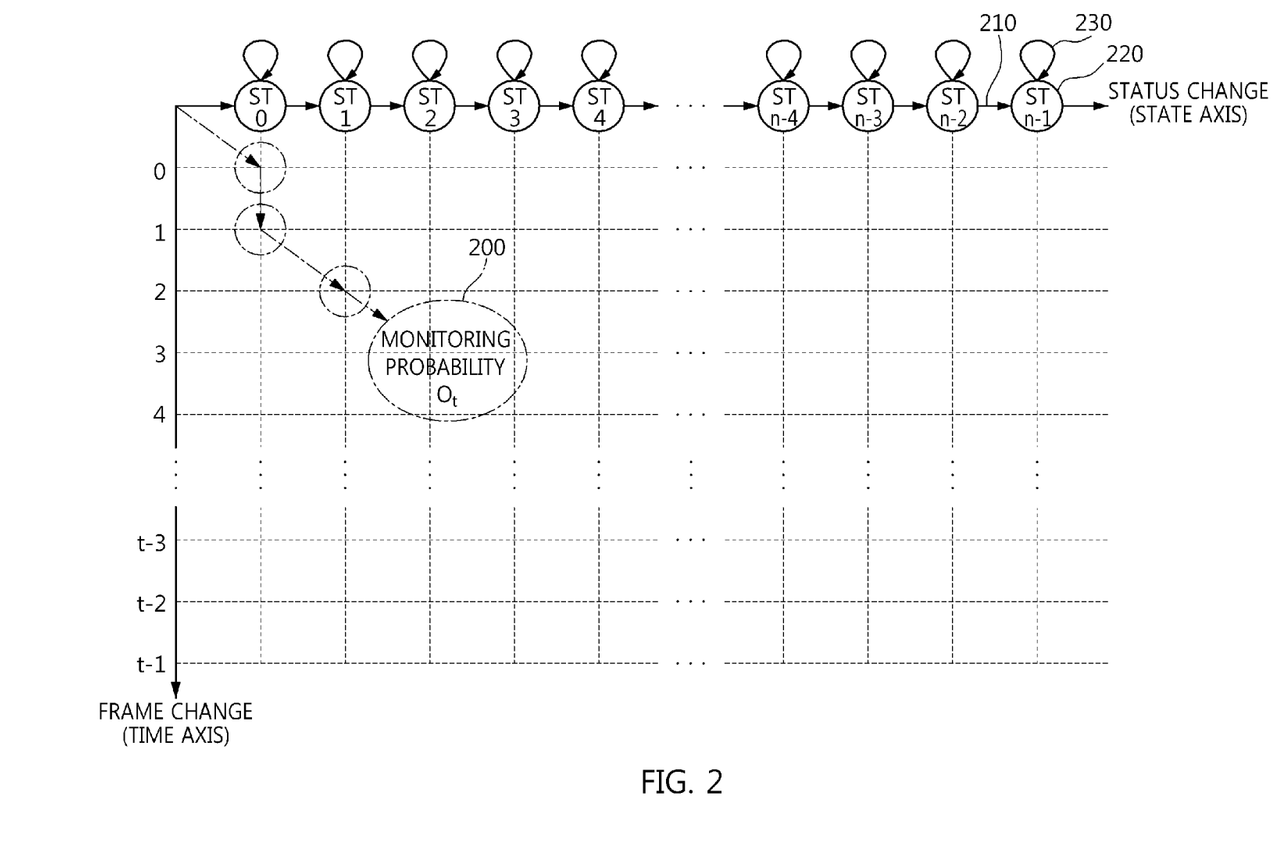
FIG. 2 is a diagram illustrating the voice recognition search network of the conventional HMM-based voice recognizer.

As illustrated in FIG. 2, the HMM-based voice recognizer performs a process of searching for an optimized path within a voice search network on a voice feature data (called an MFCC) basis.

The voice recognizer may calculate the probability (monitoring probability) 200 of corresponding to internal states 220 forming the voice search network via an already learnt acoustics database using a Gaussian mixture model (GMM) function. The variance and probability value of each of the states 220 for the calculation are stored in a learning database. Furthermore, transition probabilities 210 and 230 between the state 220 and the state 220 are stored as learning data.

If an MFCC is input to the voice recognizer on a hourly basis, the voice recognizer searches for an optimized path within the voice search network using the monitoring probability 200 and the transition probabilities 210 and 230. This process is the same as that of a Viterbi decoder. Accordingly, a Viterbi decoder is used in an HMM-based voice search process. That is, a word including a pronunciation corresponding to an optimized path becomes a voice recognition result.

As described above, the HMM-based voice recognizer determines a case where an MFCC is input on a time unit basis and the transition probabilities 210 and 230 and the monitoring probability 200 have a maximum cumulative value to be an optimized path. In general, there is a good possibility that an optimized path is a search result different from a state change path, corresponding to the utterance of a speaker, due to unwanted surrounding noise. This corresponds to the misrecognition of the voice recognizer.

Figure 3:
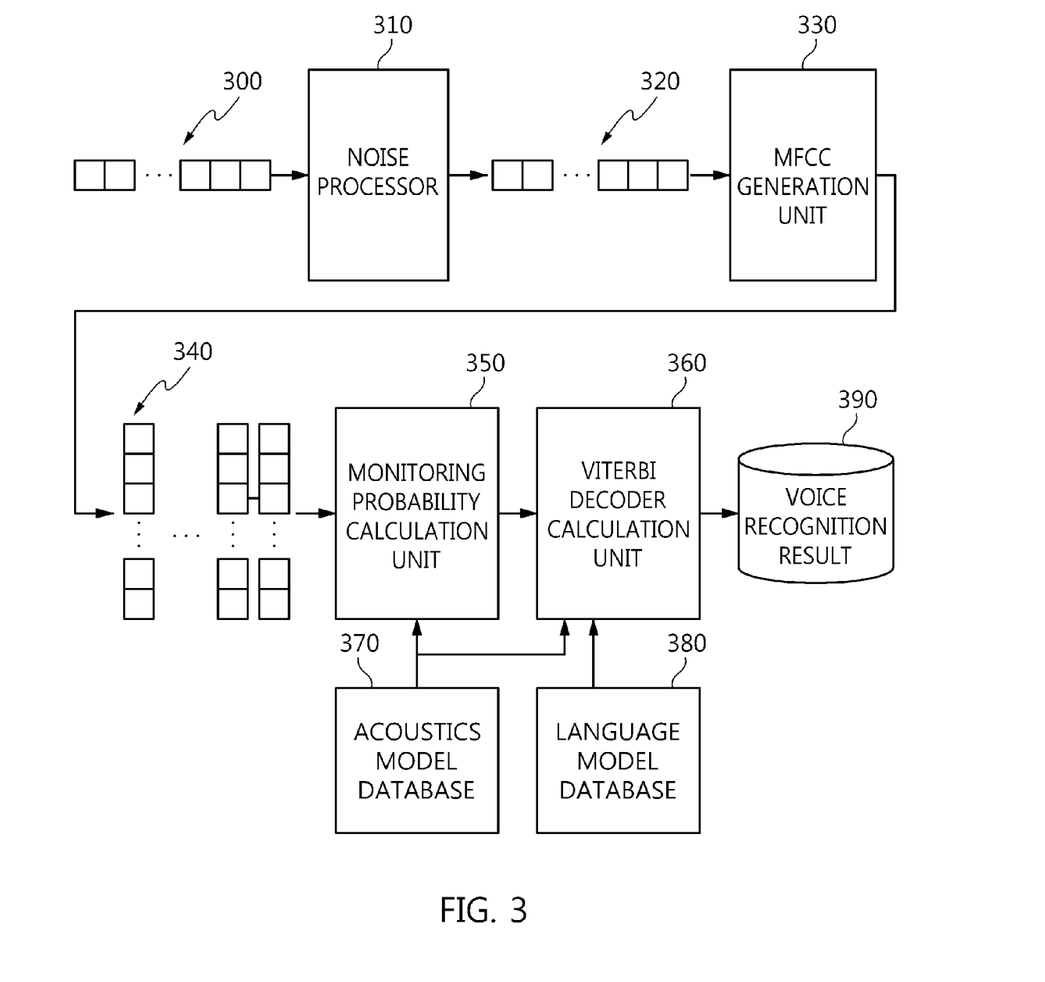
FIG. 3 is a diagram illustrating the noise processing method of the conventional voice recognizer.

In order to solve the above problem, in a conventional voice recognizer illustrated in FIG. 3, a noise processor 310 for separating only a voice signal from a signal 300 mixed with noise or compensating for the voice signal is disposed in front of an MFCC generation unit 330.

In general, a method for processing noise in voice is used in the noise processor 310 of FIG. 3. Attempts have been made to estimate a gain value for predicting and correcting the SNR of voice and noise in the frequency domain.

Figure 4:
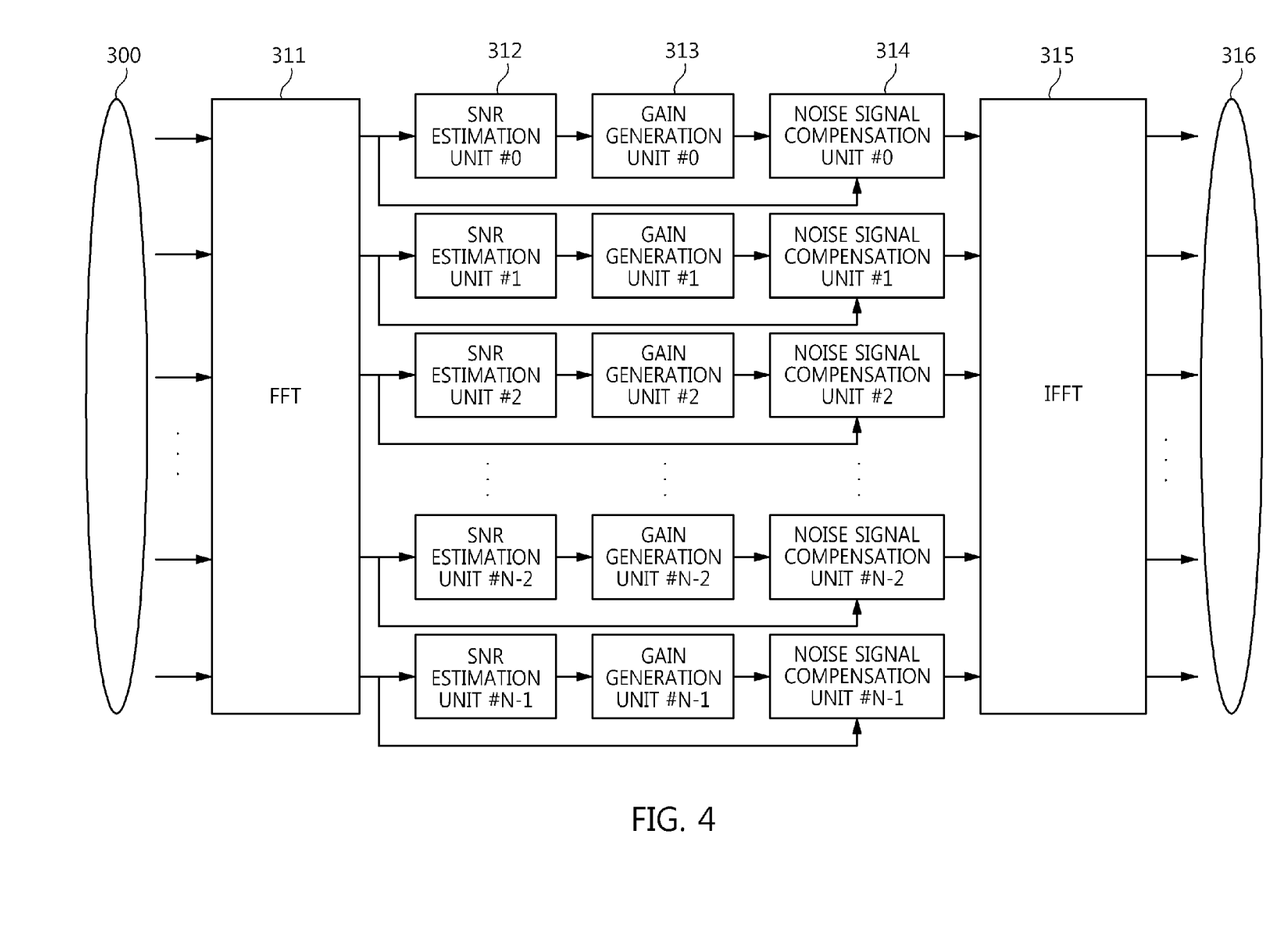
FIG. 4 is a diagram illustrating the configuration of a conventional noise processor.

In this method, as illustrated in FIG. 4, in order to transform the signal 300 mixed with noise into a frequency domain and analyze a noise signal, the signal 300 undergoes a fast Fourier transformer (FFT) 311, thereby obtaining an output value for each frequency. Furthermore, the voice signal and noise signal of each of the output values of the FFT 311 undergo an SNR estimation unit 312, a gain generation unit 313, and a noise signal compensation unit 314. Accordingly, a series of processes for improving the voice signal in the frequency domain is performed on the voice and noise signals. The improved voice signal in the frequency domain undergoes an inverse FFT 315, thereby obtaining a voice signal 316 from which noise has been removed.

A change in the probability and statistics of noise for each frequency is highly influenced by a surrounding environment based on the utterance location of a user. If a change in noise factors based on the surrounding environment of a user is small, the step of removing noise does not need to be complicated. In particular, statistical and probabilistic changes in the frequency domain of noise factors that obstruct voice recognition in an indoor environment, such as an office or a home, are very limiting. The characteristic becomes more prominent in voice words of a relatively short time unit, such as a word for search for the title of a program.

In general, in a conventional short time unit frequency domain noise analysis model, voice data in the frequency domain is obtained by repeatedly performing an FFT operation on time domain sampling data of a 20 to 30 ms unit in intervals of about 10 ms. Voice or sound signals in the frequency domain are characterized in that they can be easily analyzed statistically and probabilistically. If a change in power between frequencies is theoretically independent and surrounding noise exhibits a tendency to white noise, it can be stably predicted statistically. Due to the characteristic of sound signals, in this conventional technology, the task of dividing sampling data of a size ranging from 20 to 30 ms into frames having intervals of 10 ms, organizing changes in power value in the frequency domain into a probability model using a Gaussian distribution, and predicting and correcting the SNR of voice and noise is performed with respect to each frequency. As described above, although the conventional noise cancelling technology is theoretically elaborate, it requires a complicated procedure and complicated computation.

As a related art, U.S. Patent Application Publication No. 2010-0153104 entitled "Noise Suppressor for Robust Speech Recognition" discloses a technology in which SNR is predicted and compensated for using the output energy or power of a filter bank in which the auditory sense system of a person has been taken into consideration, thereby highly reducing complexity compared to its preceding technology.

As another related art, the thesis "Speech Enhancement Using a Minimum Mean-Square Error Log-Spectral Amplitude Estimator, Y. Ephraim and D. Malah, April, 1985, IEEE TRANSACTIONS ON Acoustics, Speech, And Signal Processing, Vol. ASSP-33, No. 2" proposes an algorithm that converts a sound signal in the time domain into a signal in the frequency domain, statistically and probabilistically models changes in the power and energy of each frequency, and then removes a noise signal component.

As yet another related art, the thesis "Robust Speech Recognition Using a Cepstral Minimum-Mean-Square-Error-Motivated Noise Suppressor, Dong Yu, Li Deng, Jasha Droppo, Jian Wu, Yifan Gong, Alex Acero, JULY, 2008, IEEE TRANSACTIONS ON AUDIO, SPEECH, AND LANGUAGE PROCESSING, Vol. 16, No. 5" discloses an improvement to a "log-MMSE suppressor" scheme in the frequency domain, i.e., a conventional noise cancellation technology.

SUMMARY

At least some embodiments of the present invention are directed to the provision of an apparatus and method for improving voice recognition, which are capable of improving a voice recognition rate by correcting the distortion of an MFCC, i.e., voice feature data required for voice recognition, attributable to noise.

In accordance with an aspect of the present invention, there is provided an apparatus for improving voice recognition, including a standard voice transmission unit configured to generate a standard voice; a Mel-frequency cepstrum coefficient (MFCC) generation unit configured to generate voice feature data (MFCC) based on the utterance of the standard voice before voice recognition; and an MFCC compensation unit configured to store a gain value generated based on the standard voice and compensate for the distortion of the voice feature data based on the utterance of a user using the gain value during the voice recognition.

The MFCC compensation unit may include a switch unit configured to perform a switching operation of switching to any one of an initialization task mode in which the gain value is generated through the generation of the voice feature data and a mode in which the voice recognition is performed based on the utterance of the standard voice; an input MFCC storage unit configured to store the voice feature data generated by the MFCC generation unit through the utterance of the standard voice in the initialization task mode; a standard MFCC storage unit configured to store the standard voice feature data of the standard voice; an MFCC comparison unit configured to generate the gain value for correcting the distortion by comparing the voice feature data generated through the utterance of the standard voice with the standard voice feature data in the initialization task mode; and a compensation unit configured to compensate for the distortion of the voice feature data based on the utterance of the user using the gain value when the switch unit performs the switching operation of switching to the mode in which the voice recognition is performed.

The MFCC compensation unit may further include a gain storage unit configured to store the gain value generated by the MFCC comparison unit.

The apparatus may further include a Viterbi decoder calculation unit configured to provide the standard voice transmission unit with a signal requesting the standard voice transmission unit to generate a different standard voice when the probability value of a voice recognition decoder Viterbi search reaches a value equal to or smaller than a target value.

The standard voice transmission unit may generate a different standard voice in response to the signal requesting the standard voice transmission unit to generate the different standard voice.

In accordance with another aspect of the present invention, there is provided a method for improving voice recognition, including generating, by a standard voice transmission unit, a standard voice; generating, by an MFCC generation unit, voice feature data based on the utterance of the standard voice before voice recognition; and compensating for, by an MFCC compensation unit, the distortion of voice feature data generated based on the utterance of a user using a gain value generated based on the standard voice during the voice recognition.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

The present invention may be subjected to various modifications and have various embodiments. Specific embodiments are illustrated in the drawings and described in detail below.

However, it should be understood that the present invention is not intended to be limited to these specific embodiments but is intended to encompass all modifications, equivalents and substitutions that fall within the technical spirit and scope of the present invention.

The terms used herein are used merely to describe embodiments, and not to limit the inventive concept. A singular form may include a plural form, unless otherwise defined. The terms, including "comprise," "includes," "comprising," "including" and their derivatives specify the presence of described shapes, numbers, steps, operations, elements, parts, and/or groups thereof, and do not exclude presence or addition of at least one other shapes, numbers, steps, operations, elements, parts, and/or groups thereof.

Unless otherwise defined herein, all terms including technical or scientific terms used herein have the same meanings as commonly understood by those skilled in the art to which the present invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Embodiments of the present invention are described in greater detail below with reference to the accompanying drawings. In order to facilitate the general understanding of the present invention, like reference numerals are assigned to like components throughout the drawings and redundant descriptions of the like components are omitted.

Figure 5:
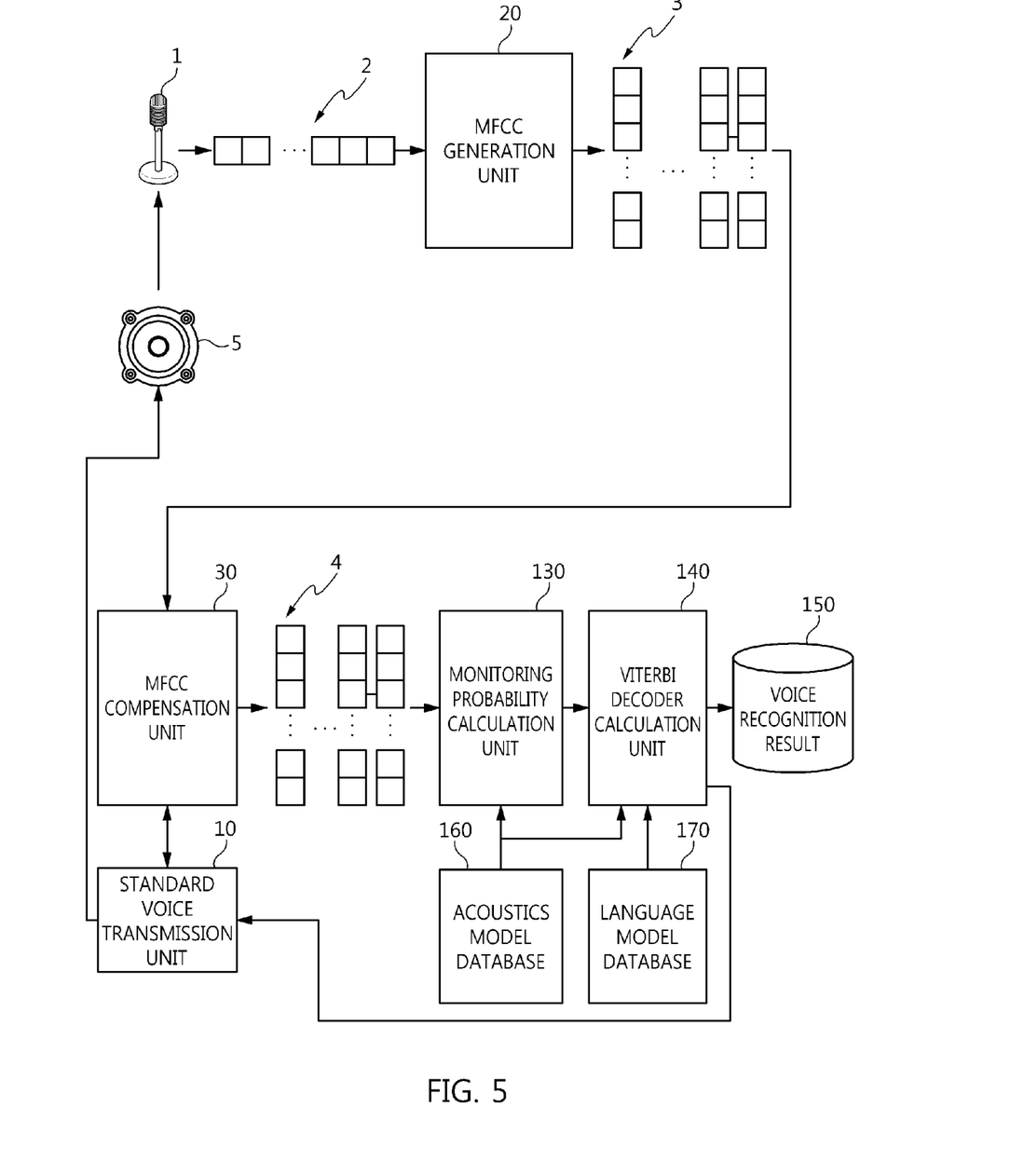
FIG. 5 is a diagram illustrating the configuration of an apparatus for improving voice recognition according to an embodiment of the present invention.

FIG. 5 is a diagram illustrating the configuration of an apparatus for improving voice recognition according to an embodiment of the present invention.

The apparatus for improving voice recognition according to the present embodiment includes a standard voice transmission unit 10, an MFCC generation unit 20, and an MFCC compensation unit 30.

The standard voice transmission unit 10 generates a standard voice via a speaker 5 before a user actually performs voice recognition. The standard voice is input to the MFCC generation unit 20 via a microphone 1, and undergoes an MFCC process in the same manner as in the conventional method.

Furthermore, the standard voice transmission unit 10 may send a standard MFCC value, corresponding to the standard voice, to the MFCC compensation unit 30.

The MFCC generation unit 20 generates a Mel-frequency cepstrum coefficient (MFCC) (which may be viewed as voice feature data) 3 based on the voice data 2 of a user that is received via the microphone 1. That is, the MFCC generation unit 20 may generate an MFCC based on the utterance of a standard voice received via the microphone 1 before voice recognition, and may generate an MFCC based on the utterance of a user during voice recognition.

The MFCC compensation unit 30 compensates for an MFCC, distorted by noise, during the voice recognition process of an HMM voice recognizer.

The MFCC compensation unit 30 previously stores standard MFCC values that must be generated when noise is not included. The MFCC compensation unit 30 compares an MFCC value actually generated by the MFCC generation unit 520 with a standard MFCC value previously stored, obtains a gain value for each of the actually generated MFCC value and the stored standard MFCC value through the order-based comparison, and stores the obtained gain value as a value for correcting the MFCC of the user voice.

That is, if the MFCC generation unit 20 receives the voice data 2 of the user and generates the MFCC when voice recognition is actually started, the MFCC compensation unit 30 generates a signal 4 including an MFCC corrected based on the gain value obtained based on the standard voice.

The signal 4 output by the MFCC compensation unit 30 may undergo the sequential calculation processes of a monitoring probability calculation unit 130 and a Viterbi decoder calculation unit 140, and may be output as a voice recognition result 150. In this case, the monitoring probability calculation unit 130 and the Viterbi decoder calculation unit 140 use the data of an acoustics model database 160 and a language model database 170.

If the probability value of a voice recognition decoder Viterbi search reaches a value equal to or smaller than a target value, the Viterbi decoder calculation unit 140 provides the standard voice transmission unit 10 with a signal requesting the standard voice transmission unit 10 to generate a different standard voice. Accordingly, the standard voice transmission unit 10 generates a standard voice different from a previous standard voice so that the generated standard voice can be used before voice recognition.

In FIG. 5, since the monitoring probability calculation unit 130, the Viterbi decoder calculation unit 140, the acoustics model database 160, and the language model database 170 perform almost the same functions as those of FIG. 1, the same reference numerals are assigned thereto.

In FIG. 5, in the voice recognizer, voice data to be processed is transferred to the voice recognition decoder (i.e., the monitoring probability calculation unit 130 and the Viterbi decoder calculation unit 140) on an MFCC basis. In this case, an advantage can be achieved in that a voice recognition rate can be improved by applying a correction scheme in the level of an MFCC distorted by noise.

In other words, if a gain value for correction is extracted by analyzing the distortion value of an MFCC attributable to noise before and after voice recognition and then the gain value is applied as a value for correcting distortion attributable to noise when the user actually performs voice recognition, complexity can be reduced and a voice recognition rate can also be improved, compared to the conventional technology.

Figure 6:
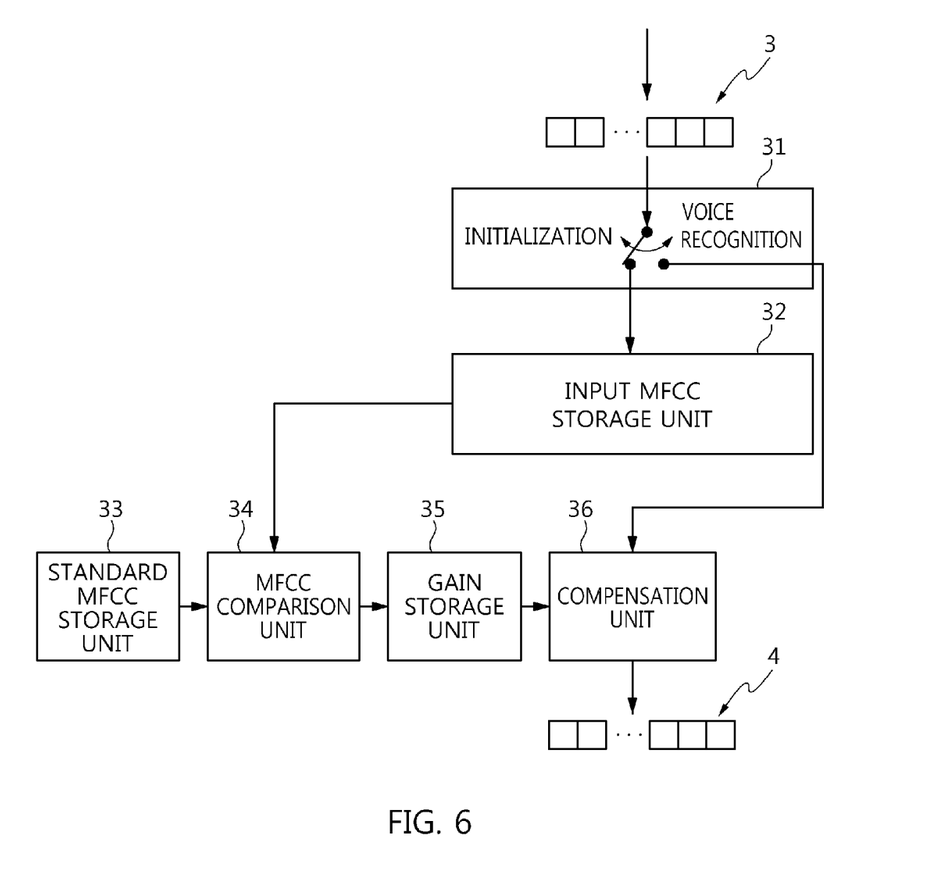
FIG. 6 is a diagram illustrating the internal configuration of an MFCC compensation unit of FIG. 5.

FIG. 6 is a diagram illustrating the internal configuration of the MFCC compensation unit 30 of FIG. 5.

The MFCC compensation unit 30 may include a switch unit 31, an input MFCC storage unit 32, a standard MFCC storage unit 33, an MFCC comparison unit 34, a gain storage unit 35, and a compensation unit 36.

The switch unit 31 performs a switching operation so that a process of processing a corresponding mode may be performed based on a mode selected between an initialization task mode in which a gain value is generated through the generation of a standard voice signal (i.e., an MFCC based on the utterance of a standard voice) and a mode in which voice recognition is performed.

The input MFCC storage unit 32 stores an MFCC generated by the MFCC generation unit 20 after a standard voice generated by the standard voice transmission unit 10 in an initialization task mode has been applied to the MFCC generation unit 20 via the microphone 1.

The standard MFCC storage unit 33 stores the MFCC of the uttered standard voice. That is, the standard MFCC storage unit 33 stores the MFCC values of the standard voice that must be generated when noise is not included.

The MFCC comparison unit 34 is provided with the MFCC generated through the utterance of the standard voice stored in the input MFCC storage unit 32 in an initialization task mode, is also provided with the MFCC of the standard voice stored in the standard MFCC storage unit 33, and then compares the MFCC generated through the utterance with the MFCC of the standard voice stored in the standard MFCC storage unit 33. Thereafter, the MFCC comparison unit 34 analyzes the distortion value of an MFCC, and extracts a gain value for correcting the distortion. The extracted gain value is used as a value that corrects the distortion of the voice data (i.e., MFCC) of a user including noise during voice recognition.

The gain storage unit 35 stores the gain value generated by the MFCC comparison unit 34.

The compensation unit 36 compensates for the MFCC signal 3 (i.e., the MFCC signal of user voice), received when the switch unit 31 performs a switching operation of switching to a mode in which voice recognition is performed, based on the gain value of the gain storage unit 35. As a result, the compensation unit 36 outputs an MFCC signal 4 compensated for during the voice recognition.

The MFCC compensation unit 30, such as that described above, previously stores the MFCC value of a standard voice in a situation in which there is no noise, generates a gain value for correcting a difference occurring when an MFCC value actually generated by the utterance of the standard voice is compared with the MFCC value of the standard voice previously stored, and applies the gain value as a compensation gain for the MFCC of a voice uttered by a user.

Figure 7:
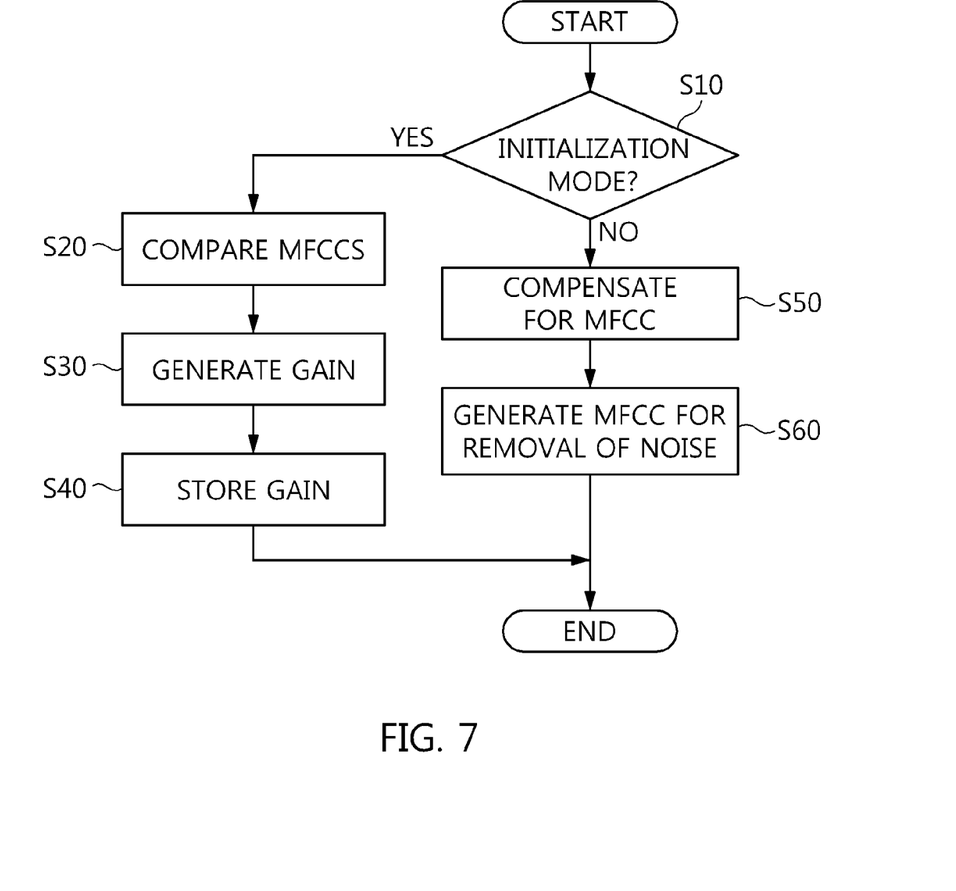
FIG. 7 is a flowchart illustrating a method for improving voice recognition according to an embodiment of the present invention.

FIG. 7 is a flowchart illustrating a method for improving voice recognition according to an embodiment of the present invention. The present invention is directed to the improvement of a voice recognition rate in a voice recognition process, and puts emphasis on the correction of the distortion of an MFCC value attributable to noise. Accordingly, in the following description, the correction of the distortion of an MFCC value attributable to noise, rather than the overall flow of the voice recognition process, is chiefly described.

First, at step S10, the MFCC compensation unit 20 determines whether the current switching mode of the switch unit 31 is an initialization task mode in which a gain value is obtained or a mode in which voice recognition is performed.

If, as a result of the determination, it is determined that the current switching mode is an initialization task mode, the MFCC compensation unit 30 compares an MFCC generated by the utterance of a standard voice stored in the input MFCC storage unit 32 with the MFCC of a standard voice stored in the standard MFCC storage unit 33 at step S20.

At step S30, the MFCC compensation unit 30 generates a value, corresponding to a difference based on the result of the comparison (i.e., the distortion value of the MFCC), as a gain value.

At step S40, the MFCC compensation unit 30 stores the generated gain value in the gain storage unit 35.

If the current switching mode is an initialization task mode as described above, the MFCC compensation unit 30 performs the above-described operations of steps S20 to step S40.

If, as a result of the determination at step S10, it is determined that the current switching mode is a mode in which voice recognition is performed, the MFCC compensation unit 30 receives an MFCC (e.g., the MFCC of a user voice) generated by the MFCC generation unit 20, and performs correction on the received MFCC based on the gain value for correction that has been previously stored in the gain storage unit 35 at step S50.

At step S60, the MFCC compensation unit 30 generates a signal (i.e., an MFFC from which noise has been removed) corrected by the correction, and outputs the generated signal.

Furthermore, the signal (i.e., the MFCC from which noise has been removed) output by the MFCC compensation unit 30 may undergo the sequential calculation processes of the monitoring probability calculation unit 130 and the Viterbi decoder calculation unit 140, and may be output as the voice recognition result 150. In this case, if the probability value of a voice recognition decoder Viterbi search reaches a value equal to or smaller than a target value, the Viterbi decoder calculation unit 140 provides the standard voice transmission unit 10 with a signal requesting the standard voice transmission unit 10 to generate a different standard voice. The standard voice transmission unit 10 generates a standard voice different from a previously generated standard voice so that the generated standard voice can be used before voice recognition.

As described above, the compensation gain of an MFCC, i.e., feature extraction data required for voice recognition, is obtained relatively simply and stored and used as a compensation value during voice recognition. Accordingly, complexity can be reduced and a voice recognition rate can also be improved, compared to the conventional technologies.

As described above, the present invention is advantageous in that a compensation gain for an MFCC, i.e., feature extraction data required for voice recognition, can be obtained relatively simply and stored and used as a compensation value during voice recognition, unlike the conventional noise cancellation methods that are employed to improve a voice recognition rate.

Although the conventional noise cancellation methods and technologies have an advantage in terms of theoretical elaborateness or accuracy, they have a disadvantage in calculation versus performance efficiency in an environment having relatively small noise, such as a home or an office. However, the present invention may have excellent performance in the obtainment of a gain value required to remove indoor noise and echo because an initially agreed standard voice signal is generated such that the accurate pattern of noise and statistical and probabilistic information can be predicted.

As described above, the optimum embodiments have been disclosed in the drawings and the specification. Although specific terms have been used herein, they have been used merely for the purpose of describing the present invention, but have not been used to restrict their meanings or limit the scope of the present invention set forth in the claims. Accordingly, it will be understood by those having ordinary knowledge in the relevant technical field that various modifications and other equivalent embodiments can be made. Therefore, the true range of protection of the present invention should be defined based on the technical spirit of the attached claims.

What is claimed is:

1. An apparatus for improving voice recognition, comprising:
    a standard voice transmission unit configured to generate a standard voice;
    a Mel-frequency cepstrum coefficient (MFCC) generation unit configured to generate voice feature data based on an utterance of the standard voice before voice recognition; and
    an MFCC compensation unit configured to store a gain value generated based on the standard voice and compensate for a distortion of the voice feature data based on an utterance of a user using the gain value during the voice recognition.

2. The apparatus of claim 1, wherein the MFCC compensation unit comprises:
    a switch unit configured to perform a switching operation of switching to any one of an initialization task mode in which the gain value is generated through generation of the voice feature data and a mode in which the voice recognition is performed based on the utterance of the standard voice;
an input MFCC storage unit configured to store the voice feature data generated by the MFCC generation unit through the utterance of the standard voice in the initialization task mode;
a standard MFCC storage unit configured to store standard voice feature data of the standard voice;
an MFCC comparison unit configured to generate the gain value for correcting the distortion by comparing the voice feature data generated through the utterance of the standard voice with the standard voice feature data in the initialization task mode; and
a compensation unit configured to compensate for the distortion of the voice feature data based on the utterance of the user using the gain value when the switch unit performs the switching operation of switching to the mode in which the voice recognition is performed.

3. The apparatus of claim 2, wherein the MFCC compensation unit further comprises a gain storage unit configured to store the gain value generated by the MFCC comparison unit.

4. The apparatus of claim 1, further comprising a Viterbi decoder calculation unit configured to provide the standard voice transmission unit with a signal requesting the standard voice transmission unit to generate a different standard voice when a probability value of a voice recognition decoder Viterbi search reaches a value equal to or smaller than a target value.

5. The apparatus of claim 4, wherein the standard voice transmission unit generates a different standard voice in response to the signal requesting the standard voice transmission unit to generate the different standard voice.

6. A method for improving voice recognition, comprising:
generating, by a standard voice transmission unit, a standard voice;
generating, by an MFCC generation unit, voice feature data based on an utterance of the standard voice before voice recognition; and
compensating for, by an MFCC compensation unit, a distortion of voice feature data generated based on an utterance of a user using a gain value generated based on the standard voice during the voice recognition.

7. The method of claim 6, wherein compensating for the distortion of the voice feature data comprises:
storing voice feature data generated through the utterance of the standard voice when a switch unit switches to an initialization task mode;
storing standard voice feature data of the standard voice;
comparing the voice feature data generated through the utterance of the standard voice with the standard voice feature data in the initialization task mode, and generating the gain value for correcting the distortion; and
compensating for the distortion of the voice feature data based on the utterance of the user using the gain value when the switch unit switches to a mode in which the voice recognition is performed.

8. The method of claim 7, wherein compensating for the distortion of the voice feature data comprises storing the gain value generated for correcting the distortion.

9. The method of claim 6, wherein generating the standard voice comprises generating a different standard voice in response to a signal requesting the different standard voice to be generated.

* * * * *